United States Patent
Wilmore

(10) Patent No.: US 6,680,714 B2
(45) Date of Patent: Jan. 20, 2004

(54) INTERACTIVE MULTI-USER DISPLAY ARRANGEMENT FOR DISPLAYING GOODS AND SERVICES

(76) Inventor: Charles E. Wilmore, 850 SW. 1st St, Boca Raton, FL (US) 33486-4652

( * ) Notice: Subject to any disclaimer, the term of this patent is extended or adjusted under 35 U.S.C. 154(b) by 234 days.

(21) Appl. No.: 10/340,045

(22) Filed: Sep. 17, 2001

(65) Prior Publication Data

US 2003/0179156 A1 Sep. 25, 2003

Related U.S. Application Data

(63) Continuation-in-part of application No. 09/259,026, filed on Feb. 24, 1999, now abandoned, and a continuation-in-part of application No. 08/665,732, filed on Jun. 14, 1996, now abandoned.

(51) Int. Cl.[7] ................................................. G09G 5/00
(52) U.S. Cl. .................... 345/1.1; 345/173; 345/903; 705/26
(58) Field of Search ..................... 345/1.1–1.2, 2.1–2.3, 345/903, 173–183; 178/18.01–18.03, 19.01; 705/26–27, 42, 43

(56) References Cited

U.S. PATENT DOCUMENTS

| | | | | | |
|---|---|---|---|---|---|
| 4,800,376 A | * | 1/1989 | Suga et al. | ................. | 340/721 |
| 5,111,103 A | * | 5/1992 | DuBrucq | ................... | 313/2.1 |
| 5,440,321 A | * | 8/1995 | Hine, Jr. | ...................... | 345/1 |
| 5,537,127 A | * | 7/1996 | Jingu | ............................ | 345/1 |
| 5,777,896 A | * | 7/1998 | Arita et al. | ................. | 364/550 |
| 5,892,509 A | * | 4/1999 | Jakobs et al. | ................. | 345/1 |
| 5,917,477 A | * | 6/1999 | Lee | ............................ | 345/173 |
| 6,085,177 A | * | 7/2000 | Semple et al. | ............... | 705/43 |
| 6,118,433 A | * | 9/2000 | Jenkin et al. | .............. | 345/173 |

* cited by examiner

Primary Examiner—Lun-Yi Lao
(74) Attorney, Agent, or Firm—Oltman, Flynn & Kubler

(57) ABSTRACT

A display arrangement having at least a video display region and at least one interactive display region, each display region being arranged as a matrix having respective rows and columns of display screens, the interactive display region having a row of monitor screens, and row of terminals, each terminal aligned with a respective monitor screen, each terminal having a plurality of key elements each having a designated key function; and computing apparatus in operative engagement with the display screens, and the monitor screens and the terminals for displaying information being stored in the computing apparatus in response to manual input entered into the key elements, and further, a display arrangement wherein the key elements are touch screen elements.

12 Claims, 3 Drawing Sheets

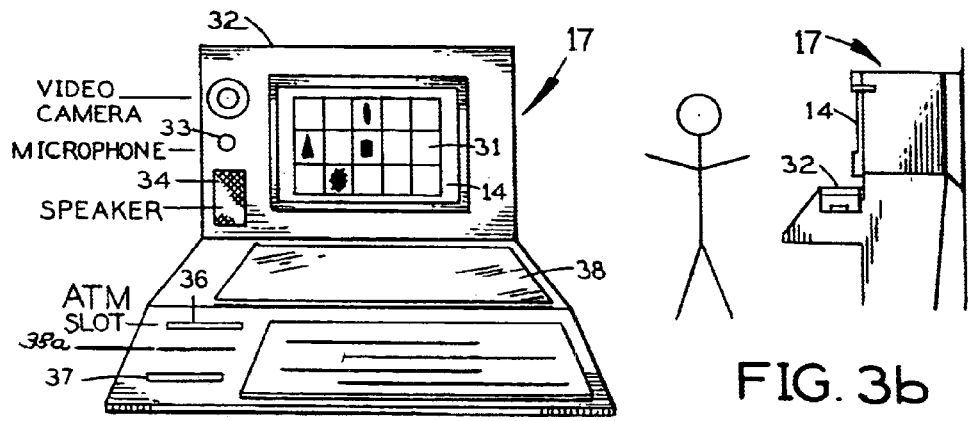
FIG. 3a
FIG. 3b
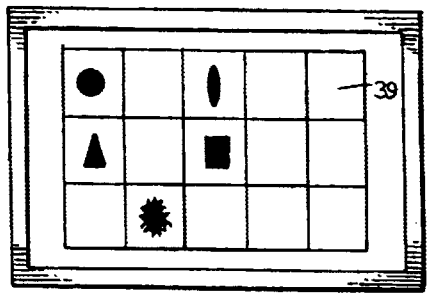
FIG. 4
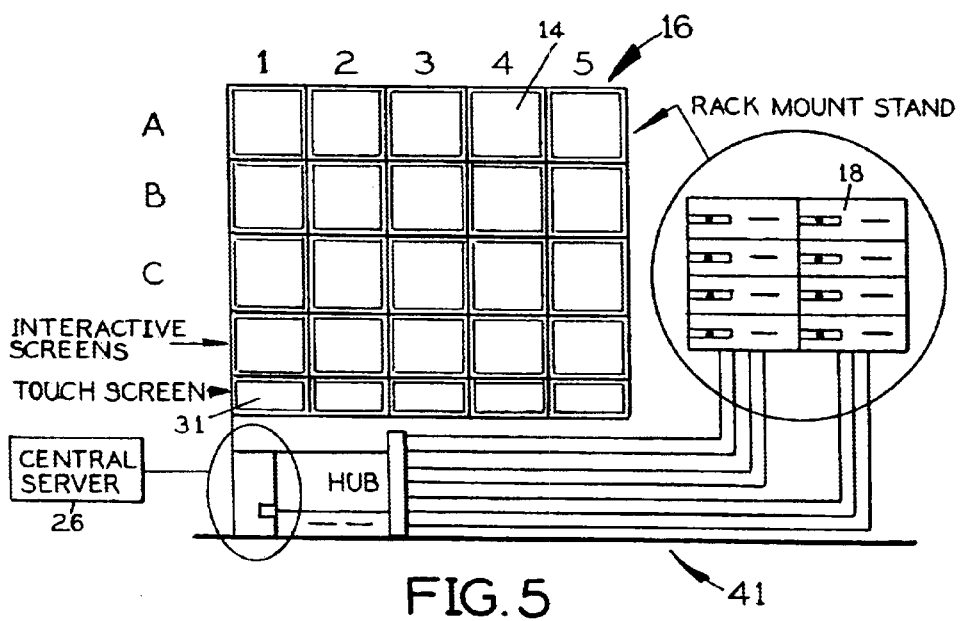
FIG. 5

INTERACTIVE MULTI-USER DISPLAY ARRANGEMENT FOR DISPLAYING GOODS AND SERVICES

This application is a continuation-in-part of Ser. No. 08/665,732, filed on Jun. 14, 1996, now abandoned; and a continuation-in-part of Ser. No. 09/259,026 filed on Feb. 24, 1999, now abandoned.

FIELD OF THE INVENTION

The invention relates to an interactive multi-user display arrangement for interactively displaying goods, services and information to the public.

BACKGROUND OF THE INVENTION

Modern computer and data transmission, imaging and storage technology has made it possible to provide consumer information on an interactive basis in public places, such as airports, bus terminals, railroad stations, shopping plazas and the like where many people come and go.

Prior art related to dissemination of the information is known, e.g., from U.S. Pat. No. 5,111,103, which discloses a mosaic of monitor units in a common assembly and coupled to voice and data information networks. This patent is essentially directed to the object of providing high-resolution displays of image information.

U.S. Pat. No. 4,800,376, shows a multiple display system for displaying data in VIDEOTEX standard. U.S. Pat. No. 4,766,641 shows an information display system with a plurality of electronic display units coupled to a computer device.

None of the prior art is directed to an interactive multi-user display arrangement directed to providing and receiving information relating to the needs of the public in public or non-public places as disclosed herein.

It is accordingly the object of the present invention to provide a video wall holding a matrix or matrices of video display monitors, screens or the like, and a row of terminals by means of which a plurality of consumers may simultaneously perform the following actions: viewing the video wall for entertainment purposes; viewing the separate presentations on separate monitors of the matrix; bringing up information on any presentation being shown on any one or more of the monitors on display screens and terminals. Information may be stored on the site of the video wall, or the consumer may gain remote access to other sites for further information.

The medium of information may be video, sound, still pictures, Internet web pages, or any other suitable method of electronic data transfer. Multiple consumers may use the terminals to interact with a local host computer or a remote computer, or with other persons at remote locations, and by means of video, audio, keyboard or touch screen input devices, or other input devices.

It is a further object of the invention to enable certain managers of the video wall display to locally or remotely access the network to modify the display or function of any computer in the display row of terminals, or video wall. This may be accomplished in any number of ways, such as: by remotely calling a computer in the network and from there editing the programs or content of any other computer on the network; and/or by locally using one of the computers on the network to edit the programs, contents or displays of any other computer on the network.

It is a further object of the invention to provide a link between consumers and producers, such that the network may perform any of the following functions: the producers, through managers of the network, may provide presentations on the matrix monitors in any number of formats; enable consumers to access information about the products by way of the network; provide access to remote databases, sales representatives or other information sources.

A further object of the network is to provide transaction capability, thereby enabling consumers to buy products or services available on the network through a number of means, such as credit card transaction, ATM transactions, check or money order transactions, cash transactions and the like.

The network is composed of three main parts; a video wall, a matrix of monitors and a row of terminals.

The video wall is a two dimensional array of monitors linked to a multiplexer or other networking devices. The multiplexer is a device that can send several signals over a single line. They are then separated by a similar device at the other end of the link. This can be done in a variety of ways: time division multiplexing; frequency division multiplexing and statistical multiplexing. The monitor is connected by data cables to the computer. The multiplexer is connected by a high-bandwidth cable to a data source, such as a computer, VCR, Laser disc, hard disk or other data source connects the multiplexer.

Information is sent by the computer to the multiplexer and from there to selected monitors. The video wall shows a display designed to attract attention to the display in a public environment.

The interactive display region of the invention is a two-dimensional array of display screens connected to a computing arrangement composed of one or several computers with data memories and interfaces. The computer may for example have a Pentium-90 central processing unit with 32 MB RAM and may contain programs to run requested presentations on a hard disk. The display screen of the computer has a viewing screen. The computer may have a graphics card e.g. 2 MB of RAM. It may also have a data network interface for interfacing remote data sources.

The computing arrangement may have programs to run any kind, number or combinations of presentations desired. A remote data server may update the computing arrangement with files and information. The computer may run on a scheduled basis. The remote server controls the schedule. When the server uploads files to the computing arrangement, it will queue the files and display them in whatever format is best suited. The data management may advantageously be of a dual file/database nature. The files may contain the information to run in any suitable format or protocol. The database determines which files to run and in which format to run them. The database can be in any suitable format, such as a script composed of a simple text file in a format compatible with the database manager and that of the matrix computer.

Data management will be exerted through the network connection. A data server runs a program that manages a database in a suitable protocol. That database provides a "schedule" of showing times for each presentation. At the appointed time the server will load the presentation files to the matrix computer in a protocol containing information on how to run the files (e.g. what program will run the software). Software on the computer may then queue the files and show them in selected order.

The server itself runs autonomously. However, when changes are to be made to the schedule, or when errors must be fixed, a manager may call the network, where a routing facility will send the call to the server. From there the manager, from his remote terminal, may edit the data and upload new files to the server for viewing. Other maintenance tasks, such as deleting old files, may be performed through the same connection.

A further part of the invention is a row of computer terminals, designed for interactive information exchange. The computing arrangement may have, i.e. 32 MB RAM and a hard disk or CD-ROM for storage of necessary program files. It may also have a network interface card, connecting it to a data hub, and from there to a dedicated data server. In addition, each terminal has a monitor, a video card, a video camera with a suitable video card, a sound card, a loudspeaker and a microphone, a touch screen, a printer and a scanner, an ATM device with receipt printer for credit card transactions, and a secure door for cash exchange.

The nature of the software and the connection is such that a plethora of different interfaces will be possible. The user may use the terminal to interface with, e.g. the Internet or any other network topology or combination thereof. Other forms of access are possible, including video conferencing and other features such as television and radio.

The terminals may get data from the server or from a remote line, again by way of direct or indirect access to a routing facility which provides external links.

Basic network access may be provided through the monitor and a touch screen. The user may use the touch screen or voice commands to navigate the network (composed of a single display or several display screens). When the input of text is required, a pop-up keyboard image will appear on the touch screen to be used as a conventional keyboard. Audio may be listened to through a speaker or the like. The camera and microphone may be used in advance settings where the user may interact live with another person.

Other interfaces are contemplated, and the terminals may be configured to be compatible with these. As an example, the Integrated Services Digital Network (ISDN) may be used. In this protocol the terminal may be used as a "video phone" for video conferencing. Here the camera, monitor, microphone and speaker come into play. The routing feature can manage ISDN and other protocols.

The purpose of the terminals is to connect a user to companies that support the display. Besides information exchange, purchase transactions may be performed through the terminal. Using ATM technology, a user may purchase whatever product is chosen from the displays and paid for by means of credit card or bank ATM card. Checks, money orders or cash may also be used. Other forms of payment are also feasible, such as "electronic cash." In that case the receipt printer will provide proof of purchase, whereupon the user may go to a designated store to receive his purchase or it may be delivered to the purchaser. Of course, the company who made the sale may wish to use any number of methods, from mail to possible direct software vending.

A data hub such as a data tandem switch connects each of the terminals to a server. It is the purpose of the hub to provide an efficient connection for all computers in the network and to allow expansion as the network grows.

As contemplated, housing for the display is provided which is suitable for creating an environment in which many people will see and use the display. For this reason the network may be housed in a secure and rugged "kiosk." The generic form of this kiosk is a two-sided wall or one-sided wall. In a two-sided wall, one side forms a video wall designed for entertainment purposes to draw people to the display. The opposite side of the wall holds the interactive matrix and the monitor matrix.

A bottom row of display screens in the interactive matrix is part of the interactive terminals. Only the monitor screens are accessible from the outside of the kiosk. The bottom row of the monitors are ergonomically designed so that a user may easily use the touch screen preferably at an angle of around 135 degrees from vertical. The bottom row terminals are separated by partitions to prevent interference from adjacent terminal noise. The loudspeaker is located in each terminal. The camera and microphone are housed in the kiosk with their input opening facing the user. The printer, scanner and ATM slot are located below the monitor within easy reach.

Within the kiosk, protected from external hazards are all of the computing components. Video and matrix computers are located in a rack mount below their monitors on the inside of the kiosk. Both servers are located at the base, as are the hubs and router. Lines out will come into the kiosk to the router. Unlocking a door on the side of the kiosk may be performed for maintenance. It may be possible to separate the halves of the kiosk for installation and repair.

This is only one possible configuration. Others include a ring of monitors facing out, with terminals below; a large ring of monitors facing inward where viewers stand and select a feature display from a terminal; as a room with an entrance and three walls; or as two walls holding the monitor matrix and video wall and the third back wall holding the terminals. More creative configurations are possible, such as scattered monitors, or a movie theater type scenario in which the viewers may watch a movie screen-like wall from their chairs, where each chair has a terminal immediately in front of it.

According to another feature, the video display region and the interactive display region are disposed in respective first and second planes, and/or the video display region and the interactive display region are facing away from each other, and/or the monitor screens and the terminals are disposed in forward-facing alignment with the interactive display region.

According to still another feature, the computer apparatus includes a computer having data memory for storing graphic information displayable on the display screens and on the monitor screens, and a plurality of work stations, each work station in operative engagement with a respective display screen, and having dedicated data memory for storing graphic information on the respective display screen.

According to a still further feature, each terminal includes a loudspeaker and a microphone for hands free communication with the terminal, and/or each terminal includes an automatic teller machine slot and a printer.

According to an additional feature, the computing apparatus includes a remote data link for data exchange with a remote data bank, and the computing apparatus includes a digital voice link for digital voice communications with a remote voice source, and the terminal may include an interactive video camera coupled to the data link for interactively exchanging video information with a remote video terminal.

Further objects and advantages of this invention will be apparent from the following detailed description of a presently preferred embodiment, which is illustrated schematically in the accompanying drawing.

BRIEF DESCRIPTION OF THE DRAWINGS

FIG. 3a and FIG. 3b are respective elevational front and side view of an interactive monitor screen and a touch terminal;

FIG. 4 is a fragmentary elevational detail front view of a monitor with a keyboard likeness superimposed on it;

FIG. 5 is a diagrammatic elevational front view of a matrix region composed of the interactive display screens and the monitor screens with the terminals below them, and a group of rack-mounted work stations serving the displays and the terminals;

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
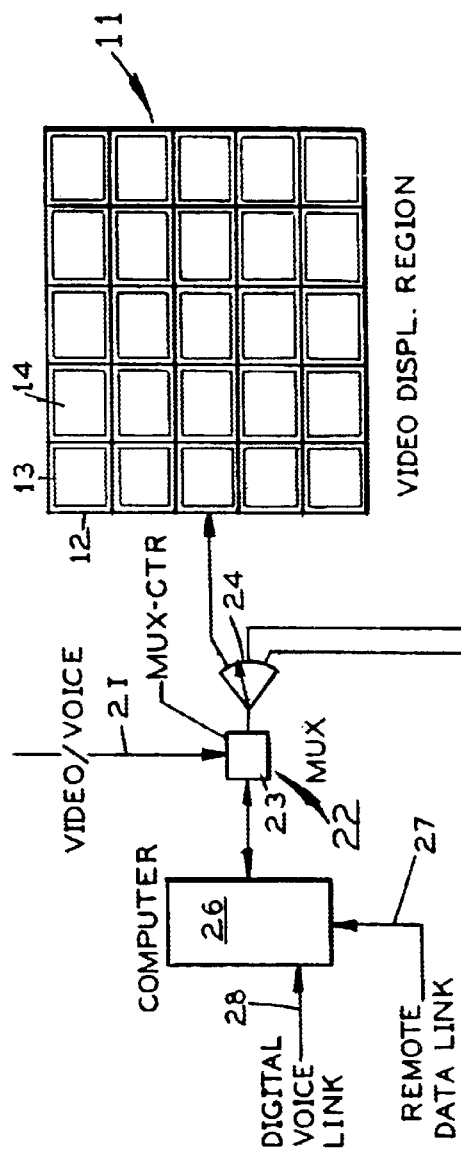
FIG. 1 is a diagrammatic block diagram of the invention showing the major building blocks.

In FIG. 1 a substantially planar video display 11 is formed as a matrix of horizontal rows 12 and vertical columns 13 of display screens 14, each display screen 14 advantageously realized as a conventional CRT screen (Cathode Ray Tube). It may alternatively be realized as any other suitable form of planar display device, e.g. as a liquid crystal LED, Electro-luminescent or any other type of display having adequate luminescence for viewing from some distance. Another display region 16 is also an interactive display region also advantageously composed of rows A, B, C, also advantageously CRT screens, and columns 1, 2, 3, 4 and 5 forming a display matrix. The bottom row D is composed of display screens 14, each combined with a respective terminal 17, advantageously embodied as a keyboard, serving as a human information input device, while the display screens in row D serve as human information output devices.

Each pair D, E of a display screen 14 and a terminal 17 may advantageously be connected with a respective personal computer 18, not seen in FIG. 1, but seen in FIG. 5, as will be described in more detail below. Each terminal 17 may in one embodiment be arranged as a touch screen of well-known construction, wherein the touch screen is superimposed on an image screen, e.g. a CRT screen, so that a person, being prompted by clues presented in certain information cells on the CRT screen, respond simply by touching an answer cell on the touch screen, in well-known manner.

Figure 2:
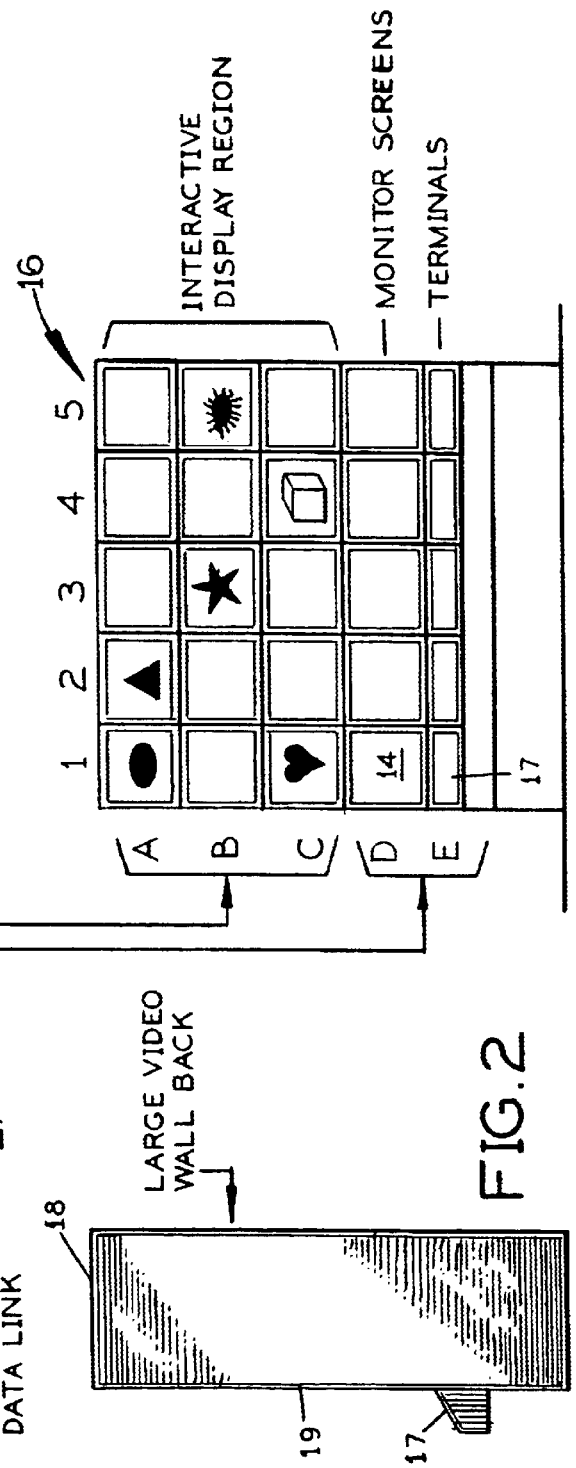
FIG. 2 is an elevational side view of a cabinet for holding the components of the invention.

All components of the video display region 11 and the interactive display region 16 are advantageously built into a supporting rack structure forming a video wall 18, such as seen in FIG. 2 in a side elevation, with the terminals 17 extending forward from the forward-facing side 19 of the video wall 18.

The video display region 11 may advantageously be formed as another video wall, herein called the video display wall, as opposed to the interactive display wall 18 holding the apparatus of the interactive display region 16.

The two video display walls may advantageously be positioned with the back sides facing each other with room between them allowing a maintenance person to work in that room. Alternatively the two walls may be positioned at intersecting planes. The entire structure is advantageously formed as a video kiosk constructed to serve the public with information, and receive information as described above. If no room is available, both halves can be separated and can be opened for service.

A video/voice channel 21 enters the system at the input of a multiplexer arrangement 22, composed of a multiplexer control 23. The multiplexer 24 is controlled by a multiplexer control 23, which is in turn controlled by a main computer 26, shown in more detail in FIG. 7. The multiplexer 24 distributes raw video, (e.g. commercial videos playing in the video display region 16 of FIG. 1) and voice (e.g. users speaking into the microphone 33 of FIG. 3a) information being entered on video/voice channel 21 to the respective display screens 14 of the video display region 11 and the interactive display region 16. The main computer 26 receives control information on a remote data link 27 preferably from a central control station (not shown) which remotely controls a plurality of video kiosks.

A digital voice link 28 provides a voice communications link which may be switched over the public switched voice network for the purpose of supplying switched two-way voice communications to the interactive terminals 17. It follows that the digital voice link may transmit voice and data in any suitable format such as digital D1/D3 carrier format or in ASCII format using modems in well-known manner. The video-voice channel 21 may operate in D1/D3 digital carrier format or in any other suitable digital network format or protocol as may be most suitable depending on location, prevailing tariffs, availability and so forth.

It should be noted that the invention concept as disclosed herein is not tied to any particular data transmission format or protocol since data transmission is a constantly evolving art, and that any suitable data transmission mode of switching, transmitting and formatting may be contemplated in implementing the invention. The same considerations apply to the data distribution architecture of the system, since numerous different arrangements may be contemplated for implementation of the invention.

FIG. 3a and FIG. 3b shows in respective front and side views an interactive terminal. In the front view of FIG. 3a an interactive touch screen is located in front of a user at a convenient height and angle. The front panel may further include a video camera 32 (FIG. 3a) enabling a distant person to view the user and a microphone 33 (FIG. 3a) and a loudspeaker 34(FIG. 3a) enables the user to have two-way voice communication with a distant person. An automatic teller machine slot, ATM slot 36 (FIG. 3a), enables the user to perform financial transactions with a bank or the like. A printer slot 37 (FIG. 3a) enables the terminal to produce a printed document, such as a receipt, a ticket or the like. Scanner bed 38 (FIG. 3a) enables a user to place a document on his display screen or the document can be printed out at the distant person's location. Disk slot 38a enables printing CDs and DVDs or receiving information to and from the network. The touch screen may be an overlay on a display screen 14 (FIG. 3a), or it may have its own imaging screen separate from the display screen 14, as shown in FIG. 3b.

FIG. 4 is a more detailed view of the touch screen 31, wherein a plurality of display and/or touch fields 39 serve to display information and prompts, and at the same time to receive responding touches from the user in well known manner.

FIG. 5 shows details of an interactive display region 16 having the above described matrix A–C, and 1–5 rows and columns of display screens, a row of interactive screen 14' and touch screen 31. As contemplated in FIG. 5, a bank of e.g. processors 18 serve to distribute data between a central server, such as the computer 26 and the individual display screens 14 and the terminal 17. The processors 18 of FIG. 5 are advantageously mounted on the backside of the video wall 18 (FIG. 2) connected to the computer 26 by cables 41 distributed on the backside of the video wall.

Figure 6:
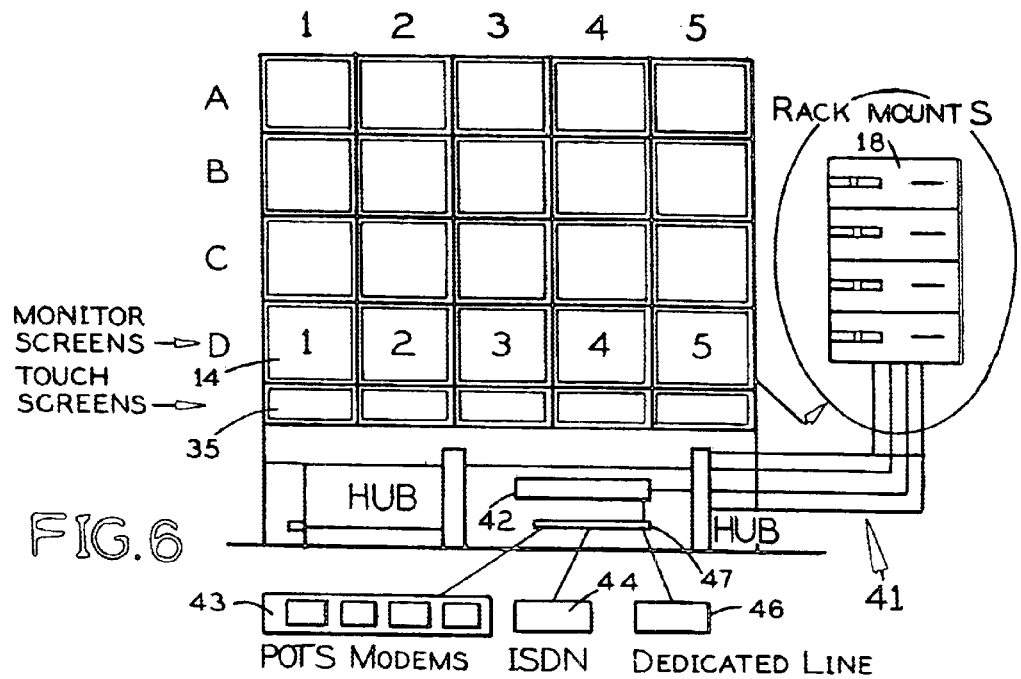
FIG. 6 is another elevational front view of a region of interactive display screens and a set of monitor screens with touch screens, various system components, a rack mount for work station and a data hub.

FIG. 6 shows an interactive display region 16 as in FIG. 5, with display screens 14 arranged in rows A–C and columns 1–5, a row D of monitor screens 1–5, and associated touch screens 31, but instead of eight processors 18 as depicted in FIG. 5, it has four processors 18 as depicted in FIG. 6, each serving a row of display screens A–D via data cables 41' connected to a common Internet server. Computer 42 is adapted to exchange data with the rest of the world via POTS modems 43 connected to the public switched telephone network, an ISDN 44 adapter for connection to the integrated services digital network, and dedicated line adapters 46 for interchange of data, voice, video and digital information with dedicated data services, as need may arise in particular locations. The POTS modems 43, ISDN adapter 44 and the dedicated line adapter 46 are all connected via a routing circuit 47 to the Internet server computer 42.

Figure 7:
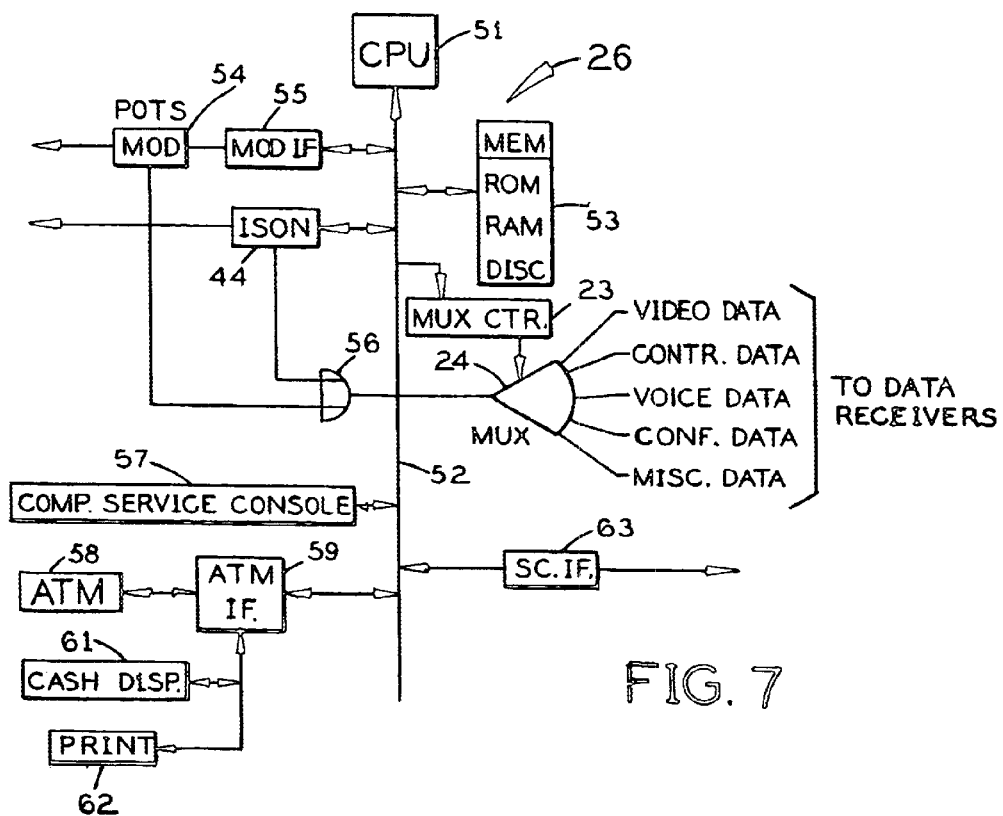
FIG. 7 is a typical computer layout for the display arrangement according to the invention.

FIG. 7 shows a more detailed block diagram of the general computer 26, briefly described above. The computer includes a central processing unit CPU 51 connected via a computer main bus 52 to a memory which contains a read-only (ROM) 53 section for fixed data and start-up of the computer, a random-access (RAM) 53 or memory product section for working data storage, and a mass memory e.g. in the form of a hard disk drive 53 for storing various large programs as required on demand of the system, e.g. maintenance, service, trouble-shooting, backup and so forth. One or more POTS modems provides data interchange with the public switched telephone network. The modem 54 communicates via a modem interface MOD IF 55 and the main bus 52 with the CPU 51. The integrated services digital network adapter ISDN 44 handles high speed digital data which are combined with the modem data in a data combining system showing symbolically as a logic OR gate 56 having an output connected to the multiplexer MUX 24 of conventional construction. The multiplexer 24 transmits and receives data sources and receivers, such as video data for the display screens 14, control data for the processors 18 of FIG. 6 or FIG. 5, voice data for the terminals 17, conference data for video conferences covering two or more display screens, and miscellaneous data such as ATM data, scanner data and the like as required for the operation of the system.

A manual service console 57 enables a maintenance person to service and monitor the system and run diagnostic routines as required for installation, modification and trouble shooting of the system.

An automatic teller machine ATM 58 interfaces with the CPU 51 via an ATM IF interface 59 communicating with the CPU 51 bus 62 and a cash dispenser 61 and a printer 62.

A scanner interface 63 interfaces with the scanner 38 to provide graphic transmission from the scanner 38 to any of the data receivers connected to the system.

While the monitor and sound/voice control functions may be performed by software entirely, it is preferred that hardware be employed in the performance of these functions. FIGS. 3a, 3b, 4 and 5 reveal the hardware and the interaction of this hardware with other hardware of the kiosk, as well as the human interface.

1) The hardware used in the single computer as a graphics generator and manager of video multiplexing uses units such as a series of Horizon-4 PCI cards from I.E. matrix Electronic Modular Solutions LTD which can drive up to 4 monitors from one PCI card, or multiple monitor video cards from the CPU. These devices let a single computer control multiple monitors. The images displayed and the functionality is controlled using software. The following is an example of functionality:

The touchscreens located on the console described in FIG. 1 from E1–E5 are input devices or touchscreens which display the content of screens A1–A5, B1–B5, C1–C5, and D1–D5.

If one of the input screens or touchscreens from E1–E5 breaks down the corresponding touchscreen above it from D1–D5 becomes the input device. rmally at all times, even though D1–D5 are touchscreens, they will be advertising screens most of the time unless a failure occurs in D1–D5. A user (at screen E1) approaching the kiosk selects one of the screens for example A5 and a second user at screen E2 also selects the content of A5. The software directs, by touching the icon map on E1, the content of D1 to A5 and the content of D2 to a new location. First it tries to swap with A5, and since A5 is already taken by D1 it will then search for an empty spot on the kiosk. (Not on the same plane, the screen may be located in a different location).

If no empty spot is found, then the software directs the video content of D2 to another kiosk at a different location to prevent loss of display revenue. Exemplifying further let us say the user at D1 is looking at the content of A5 and that the advertiser of A5 is General Motors. As soon as that screen has transferred to position D1 the advertisement changes to a menu which, for example, could have the following selections: General Motors Home Page, 2002 Models, Trucks, Passenger vehicles, Employment, Financing or Dealer locations. This same selection also displays on E1 on the console touchscreen. Let us assume that the user on E1 decides to select "dealer locations" as displayed on the screen, he has the option of saying "dealer locations" verbally or touching the icon on the touchscreen that says "dealer locations". So now both screens E1 and D1 have the selection of dealer locations. The user selects the dealer located at 11 Main Street, Anytown, U.S.A. This prompts a link to the dealer's video conference website permitting a face to face interview with the sales person at 11 Main Street, Anytown, U.S.A. The user decides to purchase a 2002 Cadillac Eldorado, so the screen splits while he sees the sales person at GM and the bottom screen prompts for method of payment. The user may select several payment options, but in this case would like to pay with his Platinum VISA, so he touches the "Platinum VISA" icon on E1 and screen D1 displays a verification request for identification instructing the user to place his driver's license on the scanning glass located on the console. Then screen D1 changes, issuing an instruction which directs the user to press the "start scan" icon displayed on touchscreen E1. After verification the user slides his credit card on the card reader and signs on the signature pad.

2) Multiple PCI sound cards with a single computer handle the voice and sound functions of the kiosk at each user interface utilizing software controlling the touchscreen and user interfaces.

These functions include voice recognition for voice control of all functions in the kiosk by users, and playback of sound associated with the advertisements being viewed at each individual user interface.

The following is an example of voice recognition functions:

A user at screen E3 wishes to make a photocopy. He presses the "Photo Copy" and the voice recognition software starts the "Photo Copy" function at screen E3. The user then sees "Place original on scanner" on the screen and also hears a voice instructing him to place his document on the scanner of E3. He is then prompted to inform the kiosk on how many copies he would like. He then enters the number manually on the console, or verbally states the desired number of copies he wants. The kiosk then instructs the user to slide his credit card on the card reader and sign his name on the signature pad. After the credit card transaction is complete, the printer in E3 produces the desired amount of photo copies scanned from the original for the user.

3) As a further example of voice command or touchscreen commands, a user may wish to access the internet for the purpose of finding a specific song, so following the steps described in 1) and 2) he touches a keyword or says the keyword and prompts a search engine to find the described musical selection for which he is looking. After using commands listed in the menu similar to those described above he is prompted to insert a rewritable CD disk (data or audio) into the external drive indicated in FIG. 1 at reference numeral 37*a* and upon sliding his credit card for payment of the content, the server splits the ATM or credit card payment into a payment of the author of the software or music, and the owner of the kiosk for the difference.

I claim:

1. A display arrangement comprising at least a video display region and at least one interactive display region, the display region being arranged as a matrix having respective rows and columns of display screens, the interactive display region, which is different from the video display region, having its own row of monitor screens and its own row of terminals, said interactive display region having a row of monitor screens, and a row of terminals, each terminal aligned with a respective monitor screen, each terminal having a plurality of key elements each having a designated key function; and computing means in operative engagement with said display screens, said monitor screens and said terminals operative for displaying information being stored in said computing means in response to manual inputs entered into said key elements.

2. A display arrangement according to claim 1, wherein said key elements are touch screen elements.

3. A display arrangement according to claim 1, wherein said video display region and said interactive display region are disposed in respective first and second planes.

4. Display arrangements according to claim 1, wherein said video display region and said interactive display region are facing away from each other.

5. A display arrangement according to claim 1, wherein said monitor screens and said terminals are disposed in forward facing alignment with said interactive display region.

6. A display arrangement according to claim 1, wherein said computing means include a computer having a data memory for storing graphic information displayable on said display screens and on said monitor screens.

7. A display arrangement according to claim 1, wherein said computing means include a plurality of work stations, each work station in operative engagement with a respective display screen, and having dedicated data memory for storing graphic information on said respective display screen.

8. A display arrangement according to claim 1, wherein each terminal includes a loudspeaker and a microphone for hands-free communication with said terminal.

9. A display arrangement according to claim 1, wherein each terminal includes an automatic teller machine slot and a printer.

10. A display arrangement according to claim 1, wherein said computing means include a remote data link for data exchange with a remote data bank.

11. A display arrangement according to claim 1, wherein said computing means include a digital voice link for digital voice communications with a remote voice source.

12. A display arrangement according to claim 1, wherein said terminal may include an interactive video camera coupled to a data link for interactively exchanging video information with a remote video terminal.

* * * * *